United States Patent
Kishimoto

Patent Number: 6,133,875
Date of Patent: Oct. 17, 2000

[54] POSITION DETERMINING APPARATUS AND POSITION DETERMINING METHOD USING THE SAME

[75] Inventor: Hiroshi Kishimoto, Yokohama, Japan

[73] Assignee: Nikon Corporation, Tokyo, Japan

[21] Appl. No.: 08/951,580

[22] Filed: Oct. 16, 1997

[30] Foreign Application Priority Data

Oct. 16, 1996 [JP] Japan .................................. 8-273859

[51] Int. Cl.$^7$ .................................................. H01Q 3/22
[52] U.S. Cl. ...................................................... 342/375
[58] Field of Search ........................... 342/375; 367/124, 367/127

[56] References Cited

U.S. PATENT DOCUMENTS

| | | | |
|---|---|---|---|
| 4,949,093 | 8/1990 | Dhanjal | 343/755 |
| 4,991,148 | 2/1991 | Gilchrist | 367/124 |
| 5,274,271 | 12/1993 | McEwan . | |
| 5,303,206 | 4/1994 | Bemb et al. | 367/127 |
| 5,361,070 | 11/1994 | McEwan . | |
| 5,576,627 | 11/1996 | McEwan | 324/639 |
| 5,609,059 | 3/1997 | McEwan . | |
| 5,652,593 | 7/1997 | Rench et al. | 342/458 |

*Primary Examiner*—Theodore M. Blum
*Attorney, Agent, or Firm*—Pillsbury Madison & Sutro LLP

[57] ABSTRACT

A position determining apparatus comprising a transmitter and a receiver connected to the transmitter through a cable with a predetermined length. The transmitter has a transmission antenna which emits an electromagnetic wave pulse, generated by a short pulse signal. The receiver includes a plurality of receiving antennas for receiving the electromagnetic wave pulse, the receiving antennas being positioned along a circular path. A distance detector calculates the relative positions of the transmitter and the receiver based on the propagation time of the electromagnetic wave pulse received by each of the receiving antennas. The propagation time is calculated with reference to the signal supplied through the cable. The transmitter has a pulse signal generator for generating said short pulse signal and a delay circuit for delaying the short pulse signal supplied to the transmission antenna by the time required for the short pulse signal to propagate through the cable. If the propagation times of the electromagnetic wave pulses received by the respective receiving antennas are equal, then the receiver is orthogonal to the line of sight between the transmitter and the center of receiver.

6 Claims, 7 Drawing Sheets

POSITION DETERMINING APPARATUS AND POSITION DETERMINING METHOD USING THE SAME

BACKGROUND OF THE INVENTION

1. Field of the Invention

This invention relates to a position determining apparatus which uses an electromagnetic wave pulse to determine the directional relationship and distance between two points which are separated by a certain distance and occasionally have a third object (e.g., a wall or floor) between them.

2. Background of the Related Art

At a construction site, it is often necessary to locate a point on the second floor of a building which is directly above a given reference point on the first floor, the two points being separated by the (first floor) ceiling/(second floor) floor. The method currently used for moving the reference point to the second floor is intricate and troublesome because it utilizes an apparatus which emits and receives a light beam. When using such an apparatus, another auxiliary tool, such as a theodolite, is necessary to determine the distance or the directional relationship between two points which are separated by a floor or a wall. A reference point is used as a starting point, and a light beam is transmitted and received through a window positioned between the two points because light can not penetrate the floor or the wall. This same method is applied to horizontal measurement.

The current state of technology requires large apparatuses and a relatively complicated method. The technology is inefficient and an obstacle in construction work.

SUMMARY OF THE INVENTION

The present invention provides a novel position determining apparatus and a method of using the apparatus. The apparatus and method can be readily used to determine the directional relationship and the distance between two points which are separated by a solid body such as a floor or wall. To achieve this objective, an electromagnetic wave pulse is given a short enough duration such that the pulse can propagate through the obstruction. The use of this wave pulse eliminates both the use of complicated instruments and the troublesome process of finding a transparent window positioned between the two points.

One embodiment of the apparatus comprises a transmitter having a transmission antenna for transmitting an electromagnetic wave pulse generated by a short pulse signal, and a receiver connected to the transmitter through a cable with a predetermined length. The transmitter has a pulse generator for generating said short pulse signal and a delay circuit for delaying said short pulse signal by a time equal to the time required for said short pulse signal to propagate through the cable. The short pulse signal which has been delayed by the delay circuit is supplied to the transmission antenna and is emitted as an electromagnetic wave pulse toward the receiving antennas.

The receiver has a plurality of receiving antennas, positioned along a circular path, for receiving the electromagnetic wave pulse. The receiver also has a distance detector which calculates the relative difference in the distance between the transmission antenna and each of the receiving antennas based on the propagation time of the electromagnetic wave pulse received by each of the receiving antennas.

In another embodiment, the position determining apparatus may be designed with a plurality of transmission antennas positioned along a circular path. The receiver has one receiving antenna and is connected to the transmitter through a cable with a predetermined length. Each of the transmission antennas transmits an electromagnetic wave pulse generated by a short pulse signal. The receiving antenna receives the electromagnetic wave pulse transmitted from each of the transmission antennas. A distance detector calculates the relative difference in the distance between the receiving antenna and each of the plurality of transmission antennas based on the propagation time of the electromagnetic wave pulse received by the receiving antenna.

The method for using the position determining apparatus involves positioning the transmitter and the receiver at different points. The position or orientation of the transmitter or the receiver is then adjusted so that the relative difference in the relative distance between the transmission antenna(s) and receiving antenna(s) becomes zero. The zero value of the relative difference in the relative distance means that the transmitter and the receiver are correctly aligned.

The single (transmitting or receiving) antenna is located on a line orthogonal to the plane containing the plurality of (transmitting or receiving) antennas. When the two devices are correctly aligned, this orthogonal line also passes through the center of the circle on which the plurality of antennas are located. Thus, if the receiver containing the plurality of receiving antennas is horizontally level, the transmitting antenna is directly below the center of the receiver. While the orthogonal line defines the directional relationship between the two points, the distance detector displays the distance between them.

An electromagnetic wave pulse can propagate through a solid body such as a wall or a floor if it is of short enough duration. The constant speed of electromagnetic radiation in combination with the measured propagation time between transmitting and receiving antennas provides sufficient information for determining the distance and/or directional relationship between two points through a solid body. Consequently, the troublesome process of using a light beam as in the conventional method can be eliminated.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent like parts throughout the several views, and wherein.

DETAILED DESCRIPTION OF THE PREFERRED EMBODIMENT

Figure 1:
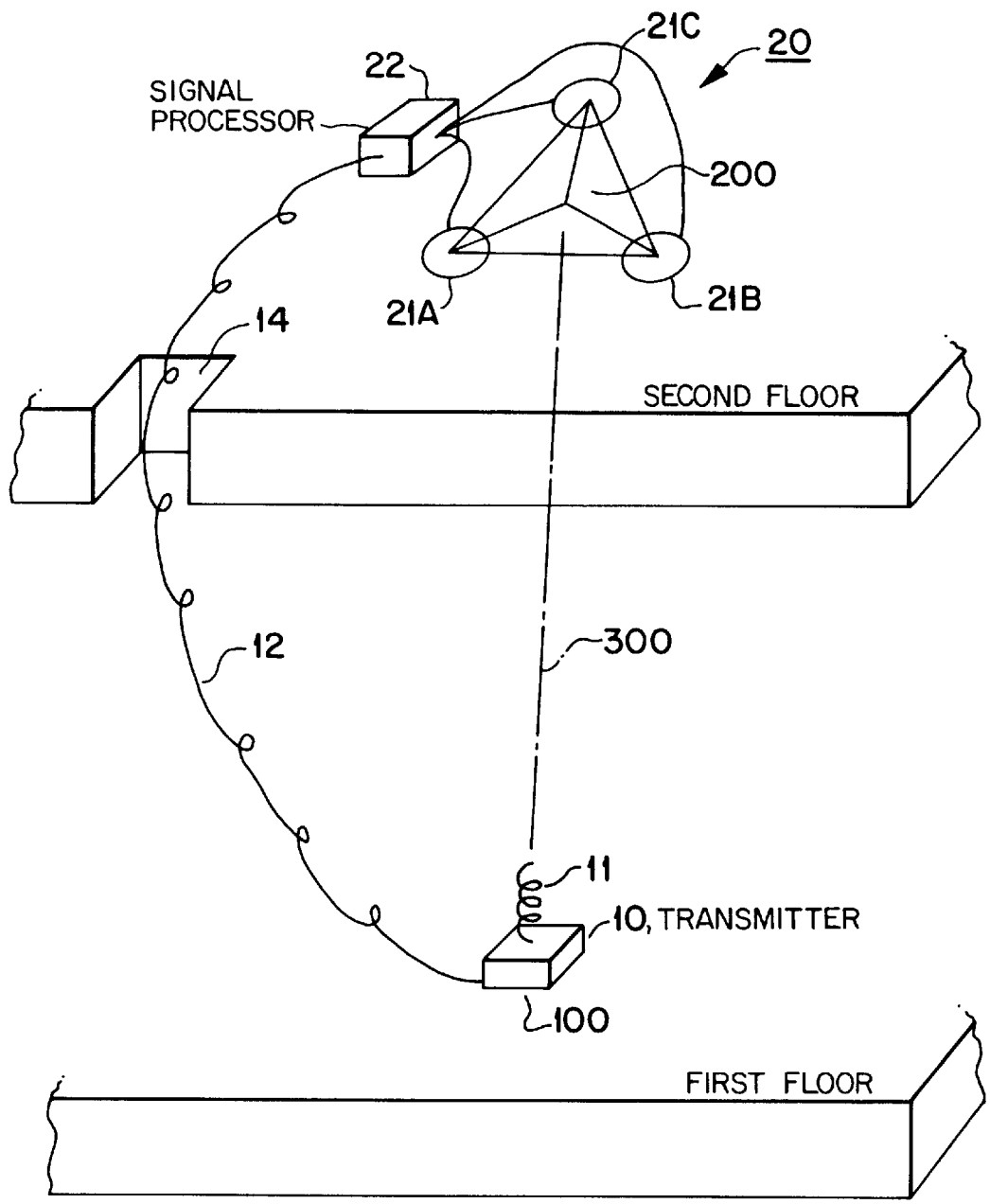
FIG. 1 is a schematic diagram showing the structure of the position determining apparatus according to an embodiment of the invention.

FIG. 1 illustrates the basic structure of the position determining apparatus according to one embodiment of the invention. A transmitter 10, which has a transmission antenna 11, is positioned at a reference point 100 on the first floor. The transmission antenna 11 transmits an electromagnetic wave pulse which is generated by a short pulse signal. In order to ensure that the electromagnetic wave pulse is able to propagate through floors or walls, a short pulse signal having a duration of 200 picoseconds or less would be appropriate.

The transmitter 10 is connected through a cable 12 of predetermined length to a receiver 20. The cable is placed through any hole or passageway 14 between the first and second floors.

The receiver 20 includes a plurality (three in this embodiment) of receiving antennas 21A, 21B and 21C which are positioned along a circle centered on a marking point 200. The receiver 20 also includes a signal processor 22 which functions as a distance detector. The signal processor 22 is connected to the antennas 21A–21C at one terminal and to the cable 12 at the other terminal. The number of receiving antennas may be four or more. If using three receiving antennas, it is preferable to arrange them at the vertices of an equilateral triangle. If using four receiving antennas, it is preferable to arrange them at the corners of a square.

Figure 2:
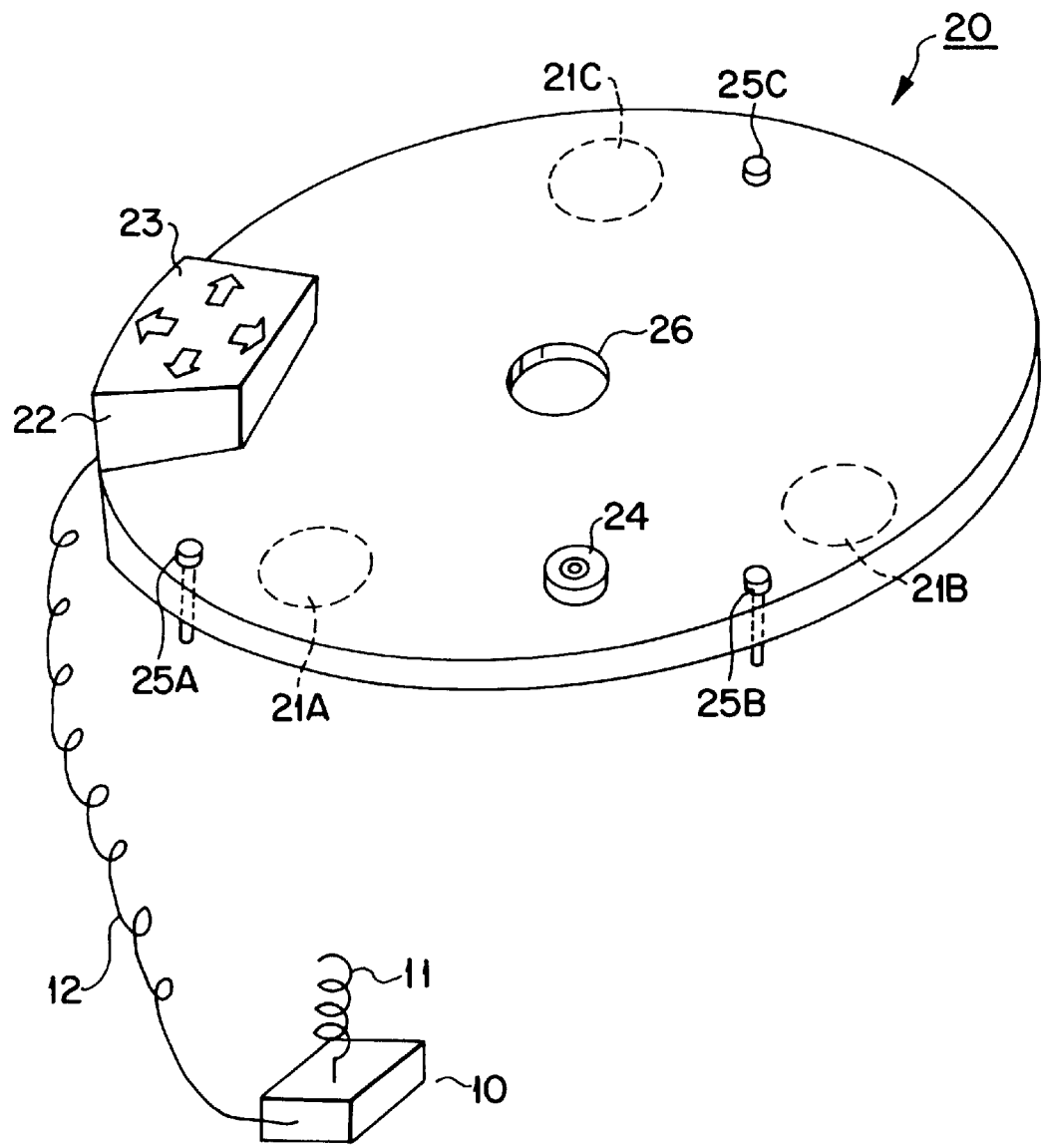
FIG. 2 is a perspective view of the receiver 20 used in the position determining apparatus shown in FIG. 1.

FIG. 2 illustrates an example of the receiver 20. The three receiving antennas 21A, 21B and 21C are fixed to the bottom surface of a disc with a diameter of 30 cm at equal intervals along a circular path. The receiving antennas 21A–21C receive an electromagnetic wave pulse transmitted from the transmission antenna 11 of the transmitter 10. The signal processor 22, which functions as a distance detector, has a display 23 on the top surface of the disc. The display 23 displays arrows for indicating moving directions and figures indicating the distance from the transmitter 10. The receiver 20 has a horizontal level 24 for leveling the positions of the receiving antennas 21A–21C and inclination adjusting knobs 25A, 25B and 25C. At the marking point 200 on the receiver 20 is a hole 26 used for marking the center position.

While monitoring the horizontal level 24 on the receiver 20, the vertical positions of the receiving antennas 21A–21C are adjusted by the inclination adjusting knobs 25A–25C so that the three receiving antennas 21A–21C are positioned in the same horizontal plane. When the receiving antennas 21A–21C are horizontally leveled, the transmission antenna 11 of the transmitter 10 emits an electromagnetic wave pulse generated by a short pulse signal toward the receiving antennas 21A, 21B and 21C. The receiving antennas 21A, 21B and 21C receive the electromagnetic wave pulse which has propagated from the transmitter to the receiver. Meanwhile, the short pulse signal which was generated by the transmitter 10 is also supplied through the cable 12 to the distance detector 22 on the receiver 20. The propagation time of the electromagnetic wave pulse received by each of the receiving antennas 21A–21C is equal to the delay time between the short pulse signal received over the cable and the electromagnetic wave pulse received by each of the receiving antennas.

The position of the receiver 20 is adjusted on the second floor so that the propagation times to the three receiving antennas 21A–21C become equal, that is, so that the distances between the transmission antenna and the three receiving antennas become equal. When these distances are equal, the line 300 connecting the reference point 100 on the first floor to the marking point 200 on the receiver is orthogonal to the plane defined by the three receiving antennas 21A–21C. Because the receiver has been leveled, the marking point 200 is then directly above the reference point 100 on the first floor. The desired reference point on the second floor on which the marking point 200 is then centered can be marked through the hole 26. The second reference point is thus readily determined without making the conventional troublesome measurement.

Figure 3:
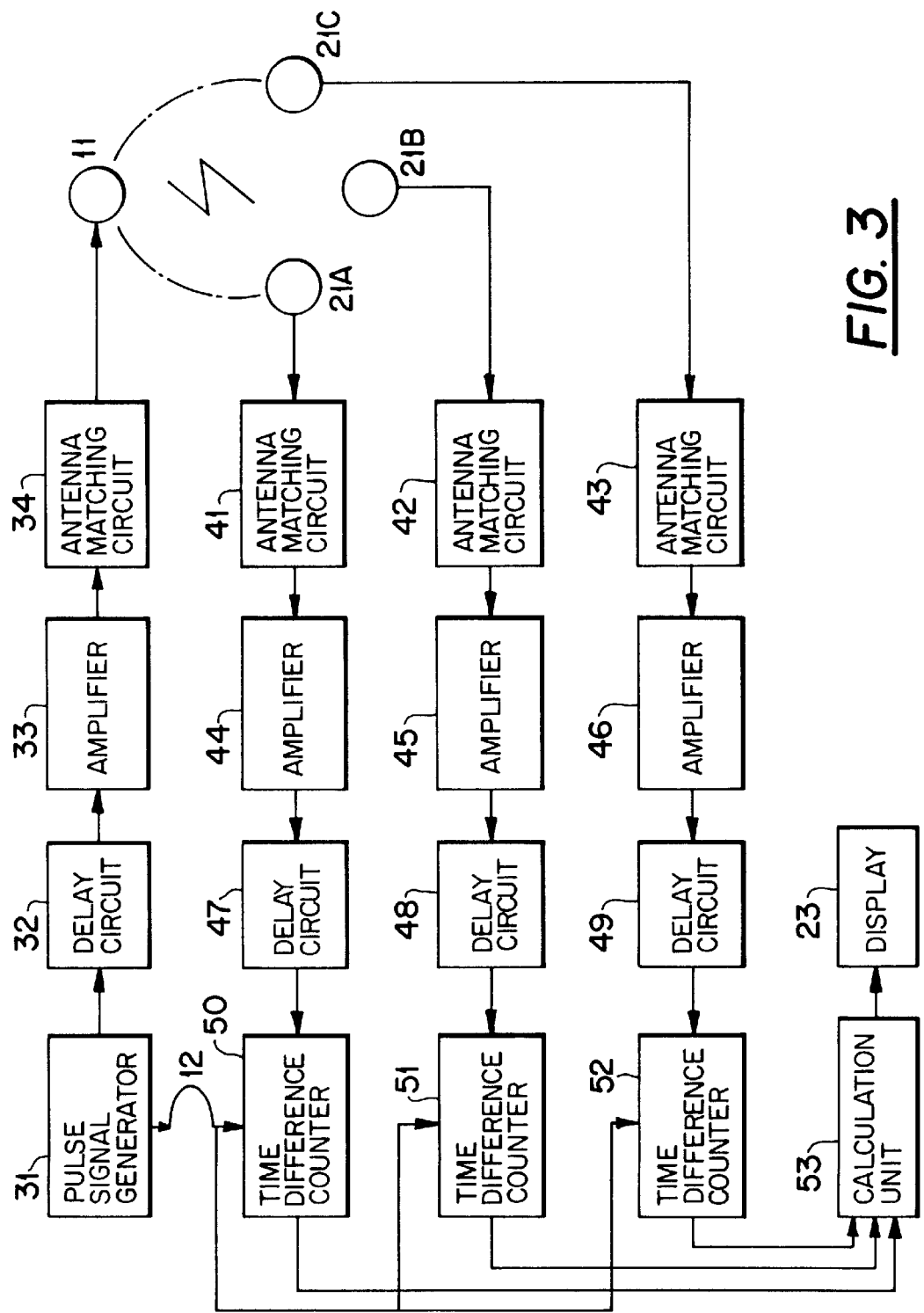
FIG. 3 is a block diagram showing the structures of the transmitter 10 and the distance detector in the receiver 20, which are used in the position determining apparatus shown in FIG. 1.

FIG. 3 is a block diagram showing the structures of the transmitter 10 and the distance detector of the receiver 20. The transmitter 10 has a pulse signal generator 31 for generating a supershort pulse signal having a period of 200 picoseconds. The electromagnetic wave pulse which is to be emitted from the transmission antenna 11 is generated from the supershort pulse signal. The pulse signal generator 31 may be a known circuit such as is used in radar. However, in order to increase the transmissivity of the electromagnetic wave pulse through a wall or a floor, it is preferable for the pulse signal generator 31 to generate a pulse signal with as short a duration as possible. The supershort pulse signal generated by the pulse signal generator 31 is supplied to the delay circuit 32 and to the time difference counters 50, 51 and 52 of the receiver 20. Thus, the pulse signal generator 31 is the source of a short pulse signal for generating an electromagnetic pulse and the source of a reference pulse signal which is supplied through the cable 12 to the distance detector.

The distance detector uses the reference pulse signal to determine the propagation time of the electromagnetic wave pulse received by each of the receiving antennas 21A–21C. The delay circuit 32 delays the short pulse signal by a time equal to the time required for the reference pulse signal to propagate through the cable 12. In general, the speed of an electromagnetic wave pulse is faster than the speed of an electric pulse signal propagating through a cable. Therefore, in order to use the short pulse signal as a reference signal in the distance detector of the receiver 20, the emission of the electromagnetic wave pulse must be delayed because the reference short pulse signal is supplied through the cable 12 to the time difference counters 50, 51 and 52.

The short pulse signal delayed by the delay circuit 32 is amplified by an amplifier 33 and supplied through an antenna matching circuit 34 to the transmission antenna 11. The transmission antenna 11 emits the electromagnetic pulse which reaches the receiving antennas 21A–21C after a predetermined time.

The electromagnetic wave pulses received by the receiving antennas 21A, 21B and 21C are supplied as electric pulse signals to the time difference counters 50, 51, 52, respectively. Before the electromagnetic wave pulses (i.e., electric pulse signals) reach the time difference counters 50, 51, 52, they pass through the antenna matching circuits 41, 42, 43, the amplifiers 44, 45, 46, and the delay circuits 47, 48, 49, respectively. The delay circuits 47–49 are provided to correct variations between the antenna matching circuits 41–43 and the amplifiers 44–46 which are connected to the respective receiving antennas 21A–21C.

Figure 4:
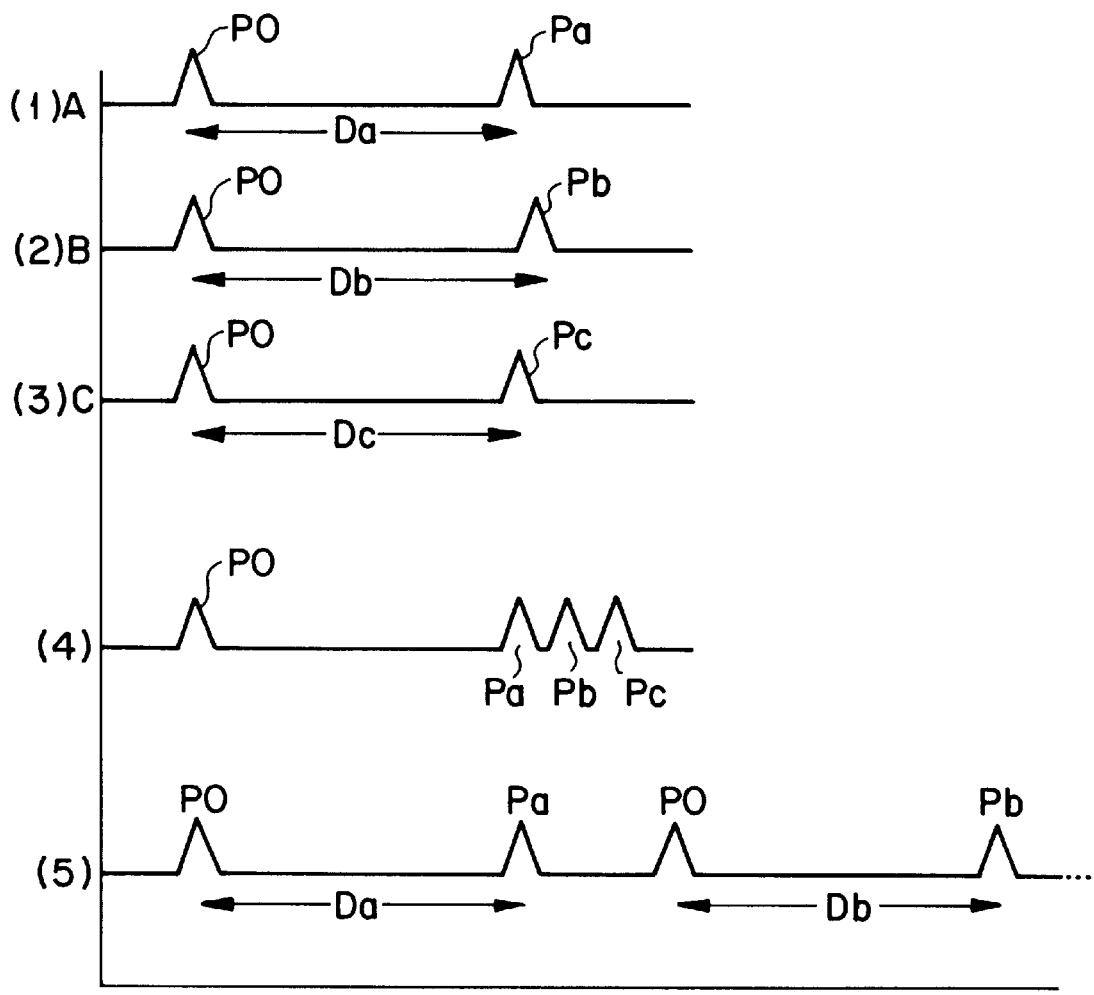
FIG. 4 illustrates several examples of the short pulse signal which is supplied to the time difference measurement circuits 50, 51, 52 shown in FIG. 3.

FIG. 4 illustrates examples of the short pulse signals which are supplied from the receiving antennas 21A, 21B, 21C to the time difference counters 50, 51, 52, respectively. Graph (1) indicates the relationship between the reference pulse signal PO supplied to the time difference counter 50 through the cable 12 and the short pulse signal Pa reproduced from the electromagnetic wave pulse received by the receiving antenna 21A. There is a delay Da between the reference pulse signal PO and the electromagnetic wave pulse received by the receiving antenna 21A and processed by the antenna matching circuit 41, the amplifier 44 and the delay circuit 47.

Graphs (2) and (3) are similar to graph (1), but show the pulse signals Pb and Pc supplied from the receiving antennas 21B and 21C to the time difference counters 51 and 52, respectively. There are delays Db and Dc with respect to the reference pulse P0.

The propagation delays Da, Db and Dc determined by the time difference counters 50, 51 and 52 are input to the calculation unit 53. The calculation unit 53 calculates the offset of the receiver 20 from the target position, the offset direction, and the distance from the transmitter 10 based on the input delays. The calculation results are displayed on the display 23 with an indication of the direction in which the receiver 20 should be moved.

Figure 5:
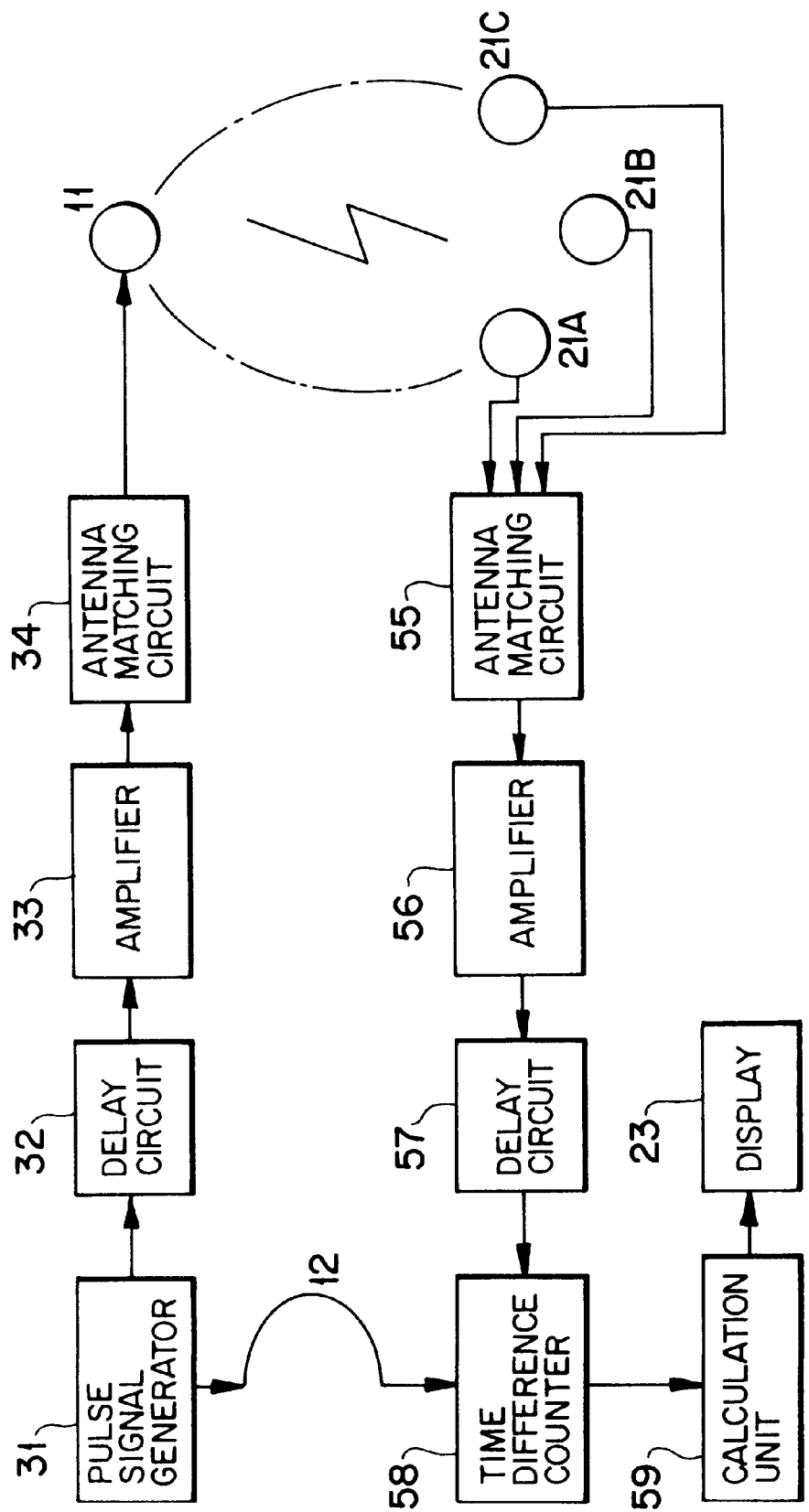
FIG. 5 illustrates another example of the distance detector in the receiver 20.

FIG. 5 illustrates another example of the distance detector within the receiver 20. In this example, the three receiving antennas 21A, 21B and 21C are all connected to a single line of an antenna matching circuit 55, an amplifier 56, a delay circuit 57 and a time difference counter 58, which are provided in the receiver 20. The outputs from the receiving antennas 21A–21C are input to the antenna matching circuit 55 in parallel. This arrangement eliminates errors which may occur due to variations between different amplifiers or antenna matching circuits.

The pulse signals Pa, Pb and Pc supplied from the receiving antennas 21A, 21B and 21C to the time difference counter 58 are shown in FIG. 4(4). The pulses Pa, Pb and Pc occur after delays with respect to the reference pulse Po supplied from the transmitter 10 through the cable 12. If the delays in the pulses Pa, Pb and Pc are equal, then the pulses Pa, Pb and Pc occur at the same point in time, and it appears that only a single pulse is supplied to the time difference counter 58. The appearance of a single pulse means that the receiver 20 is correctly aligned.

Figure 6:
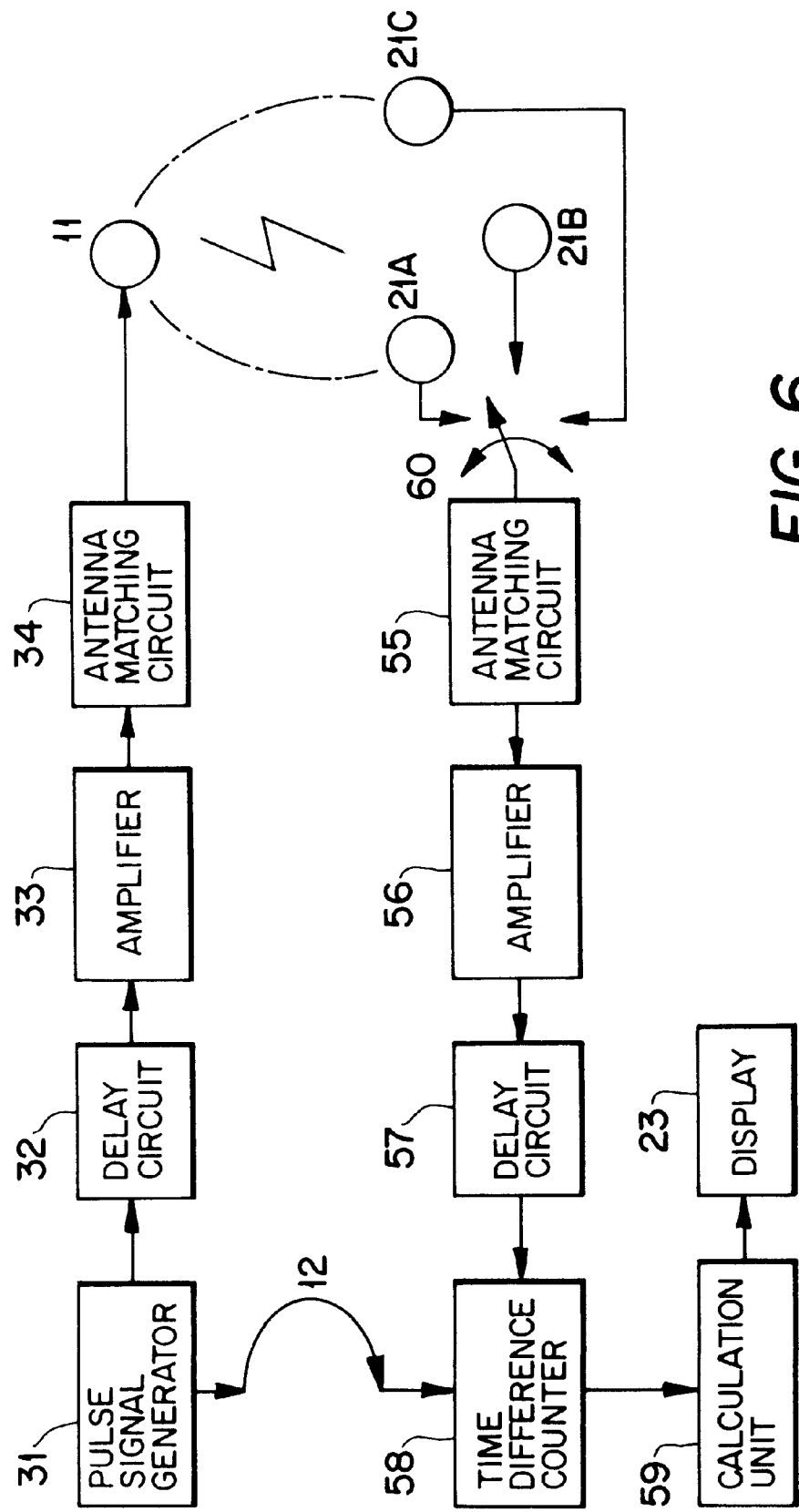
FIG. 6 illustrates another example of the transmitter 10 and the receiver 20 with a modified structure.

FIG. 6 illustrates still another example of the distance detector in the receiver 20. As in the previous example, the three receiving antennas 21A, 21B and 21C are all connected to a single line of an antenna matching circuit 55, an amplifier 56, a delay circuit 57 and a time difference counter 58. A switch 60 is provided between the antenna matching circuit 55 and the receiving antennas 21A, 21B and 21C to switch between antennas. In this arrangement, the delay time of each receiving antenna is computed in a time-divided manner.

FIG. 4(5) shows the pulse signals supplied from the receiving antennas to the time difference counter 58 in this example. A reference pulse PO is supplied through the cable 12 every time the switch 60 is activated. First, when the switch 60 is set to connect the receiving antenna 21A, the pulse signal Pa is supplied to the time difference counter 58, and a delay Da with respect to the reference pulse Po is measured. Second, the switch 60 is set to connect the receiving antenna 21B to supply the pulse signal Pb to the time difference counter 58. A delay Db of the pulse signal Pb with respect to a newly supplied reference pulse Po is measured. Third, the switch 60 is set to connect the receiving antenna 21C to supply the pulse signal Pc, and a delay Dc is measured.

The delays Da, Db and Dc measured by the time difference counters 58 are input to the calculation unit 59. The calculation unit 59 calculates the offset of the receiver 20 from the target position, the offset direction and the distance from the transmitter 10 based on the input delays. The calculation results are displayed on the display 23 with an indication of the direction in which the receiver 20 should be moved.

Figure 7:
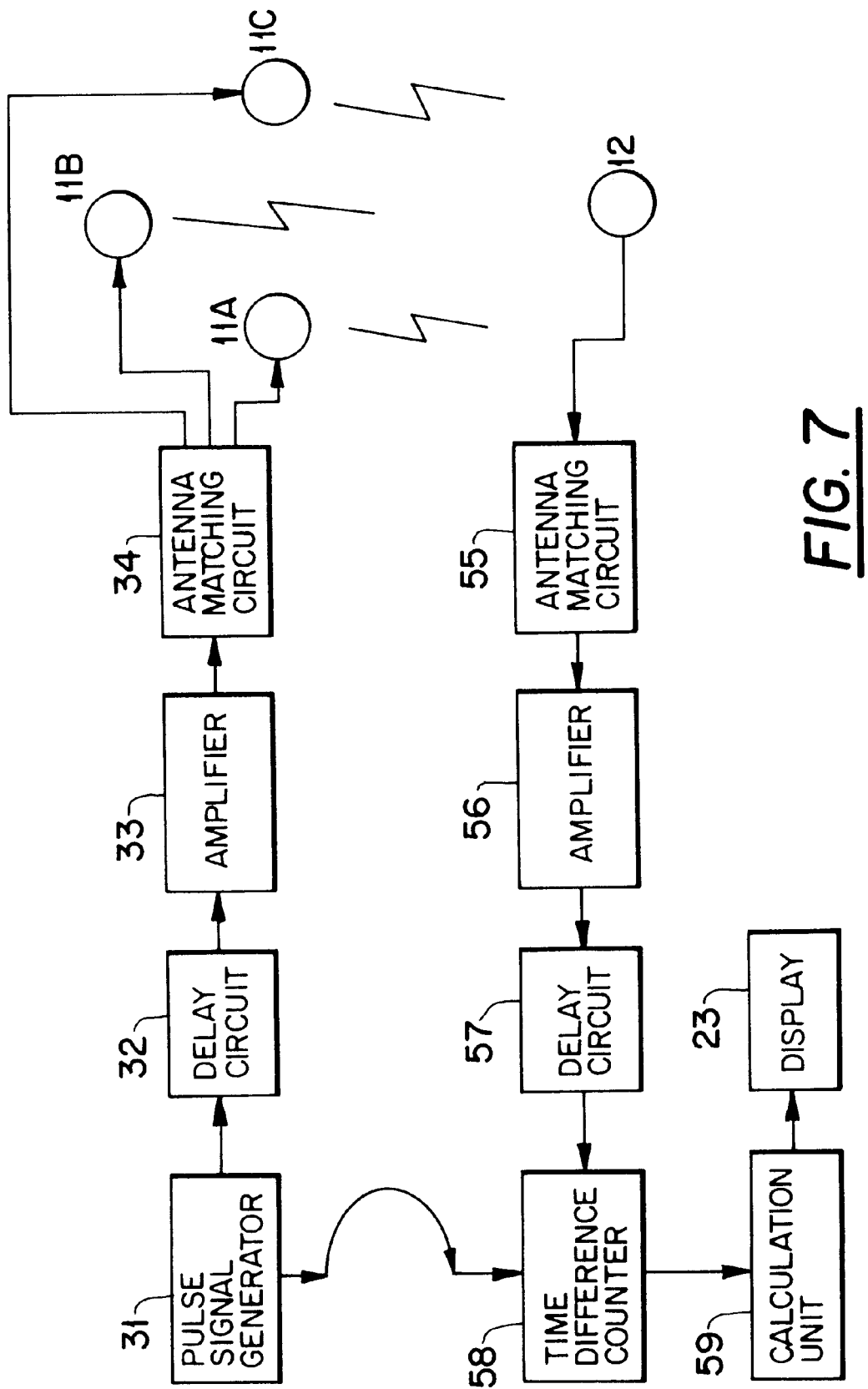
FIG. 7 illustrates the position determining apparatus according to another embodiment of the invention.

FIG. 7 illustrates the position determining apparatus according to another embodiment of the invention. The same elements as those in the previous embodiment are denoted by the same numbers. In this embodiment, the transmitter 10 has three transmission antennas 11A, 11B and 11C. These antennas 11A–11C are positioned along a circular path and connected to the antenna matching circuit 34 of the transmitter 10. Each of the transmission antennas 11A–11C emits an electromagnetic wave pulse. As in the previous embodiment, in order to increase the transmissivity of the electromagnetic wave pulse through a wall or a floor, it is preferable for the pulse signal generator 31 to generate a pulse signal with as short a duration as possible. In this embodiment, the receiver 20 has one receiving antenna 12 which receives the electromagnetic wave pulses emitted from the transmission antennas 11A–11C. The pulse signals Pa, Pb and Pc which are supplied from the receiving antenna 12 to the time difference counter 58 are the same as those shown in FIG. 4(4).

These embodiments have been described using an example in which the transmitter 10 and the receiver 20 are positioned on different floors separated by a ceiling/floor to determine a vertical distance and a directional relationship. However, it is apparent that the present invention is applicable also to horizontal measurement, i.e., to determine the distance and the directional relationship between two points in the horizontal separated by a wall. For such horizontal measurement, the transmitter 10 would be positioned on one side of the wall, and the receiver 20 would be positioned on the other side of the wall. The invention is also applicable to measurement of the distance between two points which are not obstructed by a solid body.

As described above, the distance or the directional relationship between two points which are separated by a solid body such as a wall or a floor can be easily determined by using an electromagnetic wave pulse having a very short duration. A second reference point may be located in any direction and its distance determined from a first reference point without using a troublesome process and complicated instruments.

While this invention has been described by way of exemplary embodiments, it is understood that the words which have been used herein are merely descriptive, not limiting. Changes may be made, within the scope of the appended claims, without departing from the scope and the spirit of the invention in its broader aspects. Although the invention has been described herein with reference to particular structures, components, means, materials, and embodiments, it is understood that the invention is not limited to the particulars disclosed. The invention extends to all equivalent structures, components, means, and uses such as are properly within the scope of the appended claims.

What is claimed is:

1. A position determining apparatus comprising:
    a transmitter having a transmission antenna for transmitting an electromagnetic wave pulse generated by a short pulse signal;
    a receiver having a plurality of receiving antennas for receiving the electromagnetic wave pulse, the plurality of receiving antennas being positioned along a circular path;

a cable for carrying the short pulse signal from said transmitter to said receiver; and a distance detector for determining the relative positions of the transmitter and the receiver based on the delay time between the short pulse signal received over said cable and the electromagnetic wave pulse received by each of the receiving antennas, wherein the transmitter and the receiver are separated by a solid body, and the transmission antenna is located on a line orthogonal to a plane containing the plurality of receiving antennas, and wherein the transmitter includes:

a pulse generator for generating the short pulse signal; and a delay circuit for delaying the short pulse signal by a time equal to the time required for the short pulse signal to propagate through said cable, the short pulse signal delayed by said delay circuit being supplied to the transmission antenna.

2. The position determining apparatus set forth in claim 1, wherein said cable has a predetermined length.

3. A position determining apparatus comprising:

a transmitter having a plurality of transmission antennas positioned along a circular path, each of the transmission antennas transmitting an electromagnetic wave pulse generated by a short pulse signal;

a receiver having a receiving antenna for receiving the electromagnetic wave pulse transmitted from each of the transmission antennas;

a cable for carrying the short pulse signal from said transmitter to said receiver; and a distance detector for determining the relative positions of the transmitter and the receiver based on the delay time between the short pulse signal received over said cable and each of the electromagnetic wave pulses received by the receiving antenna, wherein the transmitter and the receiver are separated by a solid body, and the receiving antenna is located on a line orthogonal to a plane containing the plurality of transmission antennas, and wherein the transmitter further includes:

a pulse generator for generating the short pulse signal; and a delay circuit for delaying the short pulse signal by a time equal to the propagation time required for the short pulse signal to propagate through the cable, the short pulse signal delayed by the delay circuit being supplied to the transmission antenna.

4. The position determining apparatus set forth in claim 3, wherein said cable has a predetermined length.

5. A position determining method comprising:

setting a transmitter, having a transmission antenna, and a receiver, having a plurality of receiving antennas positioned along a circular path, at different points;

generating a short pulse signal;

sending the short pulse signal through a cable from the transmitter to the receiver;

delaying the short pulse signal by a time equal to the time required for the short pulse signal to propagate through said cable, the short pulse signal being delayed by a delay circuit being supplied to the transmission antenna;

transmitting an electromagnetic wave pulse from the transmitting antenna to the receiving antennas;

monitoring the delay time between the short pulse signal received over the cable and the electromagnetic wave pulse received by each of the receiving antennas; and adjusting the positions of the transmitter and the receiver which are separated by a solid body, so that the transmission antenna is located on a line orthogonal to a plane containing the plurality of receiving antennas.

6. A position determining method comprising:

setting a transmitter, having a plurality of transmission antennas positioned along a circular path, and a receiver, having a receiving antenna, at different points;

generating a short pulse signal;

sending the short pulse signal through a cable from the transmitter to the receiver;

delaying the short pulse signal by a time equal to the propagation time required for the short pulse signal to propagate through the cable the short pulse signal delayed by a delay circuit being supplied to the transmission antennas;

transmitting an electromagnetic wave pulse from the transmitting antennas to the receiving antenna;

monitoring the delay time between the short pulse signal received over the cable and each of the electromagnetic wave pulses received by the receiving antenna; and adjusting the positions of the transmitter and the receiver which are separated by a solid body, so that the receiving antenna is located on a line orthogonal to a plane containing the plurality of transmission antennas.

\* \* \* \* \*